United States Patent [19]

Hartman et al.

[11] 4,174,333

[45] Nov. 13, 1979

[54] CARBOXYLATED AMIDE POLYMERS AND COATING COMPOSITIONS CONTAINING SAME

[75] Inventors: Marvis E. Hartman, Pittsburgh; Thomas R. Hockswender, Gibsonia, both of Pa.

[73] Assignee: PPG Industries, Inc., Pittsburgh, Pa.

[21] Appl. No.: 957,118

[22] Filed: Nov. 2, 1978

[51] Int. Cl.$^2$ .................. C08G 59/14; C08L 63/00
[52] U.S. Cl. .................. 260/29.2 EP; 260/29.3; 260/29.4 R; 528/45; 528/73; 528/97; 528/101; 528/113; 528/335; 528/341; 525/510; 525/514; 525/533
[58] Field of Search ............... 260/29.2 EP, 831, 834, 260/29.3, 29.4 R; 528/113, 341, 97, 101, 335, 73, 45

[56] References Cited

U.S. PATENT DOCUMENTS

| | | | |
|---|---|---|---|
| 3,360,486 | 12/1967 | Garnish | 260/2 |
| 3,639,657 | 2/1972 | Moran et al. | 260/47 EN |
| 3,678,127 | 7/1972 | Schmid et al. | 260/830 P |
| 3,962,165 | 6/1976 | Bosso et al. | 260/29.2 EP |
| 4,081,492 | 3/1978 | Traenckner et al. | 260/837 R |
| 4,134,864 | 1/1979 | Belanger | 260/18 EP |
| 4,139,510 | 2/1979 | Anderson | 260/18 N |

*Primary Examiner*—Earl A. Nielsen
*Attorney, Agent, or Firm*—Charles R. Wilson

[57] ABSTRACT

Carboxylated amide polymers and coating compositions containing same are especially useful for the coating of food and beverage containers. The carboxylated amide polymers are the reaction product of (1) a compound of formula:

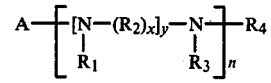

wherein A is the organic residue resulting from a ring opening reaction of a 1,2-epoxy group on a polyepoxide with ammonia or amine, $R_1$ is hydrogen or a $C_{1-4}$ alkyl group, $R_2$ is a $C_{2-12}$ alkylene group, x is 0 or 1, y is from 0 to 4, $R_3$ is hydrogen or a $C_{1-6}$ alkyl group, $R_4$ is hydrogen or a $C_{1-6}$ alkyl group, provided at least one $R_1$, $R_3$ or $R_4$ is hydrogen, and n is at least 1.0 with (2) a cyclic anhydride of a dibasic carboxylic acid. The carboxylated amide polymers can be made water reducible by neutralizing the polymer with an organic or inorganic base and used in aqueous coating compositions.

37 Claims, No Drawings

CARBOXYLATED AMIDE POLYMERS AND COATING COMPOSITIONS CONTAINING SAME

BACKGROUND OF THE INVENTION

The subject invention relates to carboxylated amide polymers. The carboxylated amide polymers are useful in coating compositions, especially aqueous coating compositions, for the coating of food and beverage containers.

Containers intended for use in the food and beverage industry typically have an interior coating applied to them. The coating is quite thin and serves the purpose of protecting the container from any adverse effects from the food or beverage as well as insuring that the food or beverage is not contaminated or given a bad taste by the container. Aluminum, steel and tin-plated steel are typically used in the construction of food and beverage containers.

Various epoxy and acrylic coating compositions have been used for the coating of food and beverage containers. Any coating must meet stringent requirements in order to be useful for this purpose. The coating must adhere well to the base metal and must possess a certain set of flexibility, extensibility and adhesion characteristics so as to withstand the processing of the container itself. The coating must also be able to resist heat which can be encountered during processing of the container. Additionally, the coating itself must not affect the taste of a food or beverage which is put into the coated container. Several solutions have been offered for meeting the aforementioned requirements. Many different compositions have met with limited success. However, there is still a need for a coating composition which is able to meet all the aforementioned requirements.

An aqueous coating composition which possesses the proper combination of properties would be most desirable. This is because of recent concerns as to the polluting effect which the organic solvents in an organic solvent based composition can have on the environment. An aqueous coating composition is free of these concerns.

There has now been found novel carboxylated amide polymers which possess many of the properties desired of a polymer intended for use in the coating of a food or beverage container. The carboxylated amide polymer can be made water reducible and thus applied from an aqueous composition.

As used herein all percentages and ratios are by weight unless otherwise indicated.

SUMMARY OF THE INVENTION

Carboxylated amide polymers are the reaction products of (1) compounds of the formula

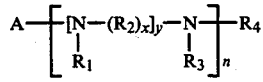

wherein A is the organic residue resulting from a ring opening reaction of a 1,2-epoxy group on a polyepoxide with ammonia or amine, $R_1$ is hydrogen or a $C_{1-4}$ alkyl group, $R_2$ is a $C_{2-12}$ alkylene group, x is 0 or 1, y is from 0 to 4, $R_3$ is hydrogen or a $C_{1-6}$ alkyl group, and $R_4$ is hydrogen or a $C_{1-6}$ alkyl group, provided at least one $R_1$, $R_3$ or $R_4$ is hydrogen and n is at least 1.0 with (2) cyclic anhydrides of dibasic carboxylic acids. The carboxyl group on the polymer can be neutralized with organic or inorganic basic compounds and thus made water reducible.

DETAILED DESCRIPTION OF THE INVENTION

The subject invention relates to carboxylated amide polymers, their process of production and their use in coating compositions. The carboxylated amide polymers can be made water reducible and used in aqueous coating compositions. The polymers and their use in coating compositions are described in the following paragraphs.

In one process of manufacture, a polyepoxide resin is reacted with ammonia or an amine having at least 2 active hydrogen atoms and the resultant compound reacted with a cyclic carboxylic anhydride to obtain the desired carboxylated amide polymers.

The polyepoxide resin used as a starting reactant is a compound or mixture of compounds having more than 1.0 epoxy groups per molecule. Several polyepoxide resins are known, examples of which can be found in the *Handbook of Epoxy Resins*, Lee and Neville, 1967, McGraw-Hill book Company.

A preferred class of polyepoxides are the polyglycidyl ethers of polyphenols, such as bisphenol-A. These are produced by etherification of a polyphenol with epichlorohydrin in the presence of an alkali. The phenolic compound can be 1,1-bis(4-hydroxyphenyl)ethane; 1,1-bis(4-hydroxyphenyl)isobutane; 2,2-bis(4-hydroxytertiarybutylphenyl)-propane; bis(2-hydroxynaphthyl)methane; 1,5-dihydroxynaphthalene; and 1,1-bis(4-hydroxy-3-allylphenyl)-ethane. Another quite useful class of polyepoxides are produced similarly from polyphenol resins.

Also suitable are the similar polyglycidyl ethers of polyhydric alcohols which are derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, and 2,2-bis(4-hydroxycyclohexyl)propane.

Cycloaliphatic polyepoxide resins can also be used. Such resins are prepared by epoxidation of unsaturated cyclic polyene with organic peracids, e.g., peracetic acid.

Another useful class of polyepoxides are those containing oxyalkylene groups in the epoxy molecule. Such oxyalkylene groups are typically groups of the general formula:

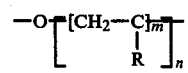

wherein R is hydrogen or alkyl, preferably lower alkyl (e.g., having 1 to 6 carbon atoms) and where, in most instances, m is 1 to 4 and n is 2 to 50. Such groups can be pendent to the main molecular chain of the polyepoxide or part of the main chain itself. The proportion of oxyalkylene groups in the polyepoxide depends upon many factors, including the chain length of the oxyalkylene group, the nature of the epoxy and the degree of modification desired.

In addition to the polyepoxide resins described above, addition polymerization polymers containing pendent epoxy groups are also utilized in this invention. Such polymers are made by copolymerizing a wide variety of polymerizable vinyl monomers including monomers such as glycidyl acrylate and glycidyl methacrylate. Suitable vinyl monomers include those which do not contain a group reactive with the epoxy group and preferably include the alpha-beta ethylenically unsaturated carboxylic acid esters of saturated alcohols containing from 1 to 8 carbon atoms and the monovinyl aromatic monomers of the benzene class, e.g., styrene and vinyl toluene.

Hydantoin based polyepoxide resins as described in U.S. Pat. No. 4,110,287, issued Aug. 29, 1978 to Bosso and Castellucci and in an article in Die Angewandte Makromolekulare Chemie, by Jurgen Habermeier, Vol.63, (1977), p.63-104, (the disclosures of which are hereby incorporated by reference) can also be used.

As above indicated, the polyepoxide resin is reacted with ammonia or an amine having at least 2 active hydrogen atoms. The active hydrogen atoms can be on the same nitrogen atom, e.g., the primary amines or on different nitrogen atoms in a compound, e.g., di- or polyamines wherein the active hydrogen atoms can be on the same nitrogen atom, or on two or more nitrogen atoms. Examples of suitable primary amines include ethyl amine, propyl amine, isopropyl amine and butyl amine. Suitable di- and polyamines include hydrazine, ethylene diamine, propylene diamine, butylene diamine, hexylene diamine, diethylene triamine, tetraethylene pentamine, N-methylethylene diamine, N-methylbutylene diamine, N,N-dimethylethylene diamine, N,N-dipropylethylene diamine, and N,N-dimethylhexylene diamine. Preferably, ammonia or ethylene diamine is used.

The reaction of the polyepoxide resin with the ammonia or amine involves a simple ring opening reaction where the resultant ungelled product is the amine terminated product of a polyepoxide resin. It is desired that substantially all of the 1,2-epoxy groups contained in the polyepoxide resin be reacted with the ammonia or amine. Thus, a molar excess, up to 10:1 excess, of the ammonia or amine to epoxy groups is used in the reaction. Even greater excesses of ammonia or amine can be used, though are avoided because of the added costs involved without any added benefits. The reaction of the polyepoxide resin with the ammonia or amine occurs over a wide range of temperatures, preferably from about 30° C. to about 100° C. The time of reaction varies according to the temperature used in the reaction.

The resultant amino functional resin is next reacted with a cyclic anhydride of a dibasic carboxylic acid. A cyclic anhydride is used so as to result in carboxylated amide polymers. The carboxyl groups can be neutralized as discussed below to impart water-reducibility to the polymers. Suitable cyclic anhydrides of dibasic carboxylic acids include succinic anhydride, maleic anhydride, trimellitic anhydride, phthalic anhydride, hexahydrophthalic anhydride and chlorosuccinic anhydride. A preferred cyclic anhydride of a dibasic carboxylic acid is succinic anhydride.

Reaction of the amino functional polymer and the cyclic anhydride occurs over a wide range of temperatures, though preferably the temperature ranges from about 30° C. to about 100° C. The time of reaction is dependent on the reaction temperature used and can vary widely. Molar excesses of the anhydride are avoided because of the consequent difficulty in removing the unreacted anhydride from the reaction mixture. A molar ratio of anhydride to amino groups of from about 0.1:1 to about 2:1 are used, with the preferred molar ratio being from about 0.8:1 to about 1.2:1.

By way of illustration only, a theorized reaction scheme between (a) the polyepoxide resin and a primary amine, followed by (b) reaction of the product of (a) with the cyclic anhydride of a dibasic carboxylic acid is as follows:

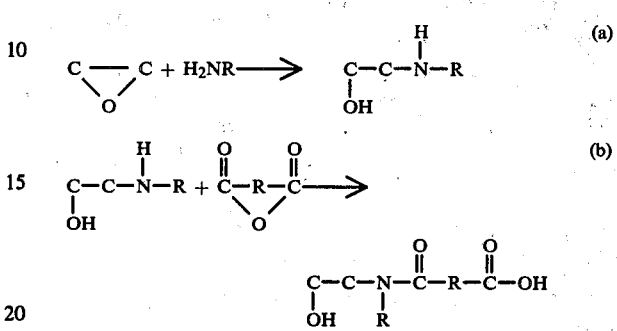

A solvent or mixture of solvents is preferably included in the reaction of the epoxy resin and ammonia or amine and/or in the anhydride reaction for the purpose of achieving better reaction control. Any nonreactive solvent can be used, examples of which include the ketones and alcohols. Specific examples of suitable solvents are methyl ethyl ketone, methyl butyl ketone, ethanol, propanol, isopropanol and butanol. Surprisingly, the alcohol can oftentimes be used as a solvent. It would be expected that the anhydride would react with it; however, the rate of reaction of the anhydride with the amine terminated epoxy group derivative is in most cases greater than its rate of reaction with the alcoholic solvent.

The resulting product is a carboxylated amide polymer, being the reaction product of (1) compounds of the formula:

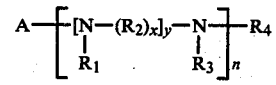

wherein A is the organic residue of a ring opening reaction between a 1,2-epoxy group on the polyepoxide with the nitrogen atom of the ammonia or an amine, $R_1$ is hydrogen or a $C_{1-4}$ alkyl group, $R_2$ is a $C_{2-12}$ alkylene group, x is 0 or 1, y is from 0 to 4, $R_3$ is hydrogen or a $C_{1-6}$ alkyl group, $R_4$ is hydrogen or a $C_{1-6}$ alkyl group, provided at least one $R_1$, $R_3$, or $R_4$ is hydrogen and n is at least 1.0 with (2) the cyclic anhydride of dibasic carboxylic acid. Thus, when ammonia or a primary amine is reacted with the polyepoxide resin, y is 0 whereas when one of the di- or polyamines is reacted with the polyepoxide resin, y is from 1 to 4. The reaction of hydrazine with the polyepoxide resin leads to a polymer wherein x is 0 and y is 1.

Coating compositions containing the aforedescribed carboxylated amide polymer consist essentially of from about 25 percent to about 99 percent of the carboxylated amide polymer, and from about 1 percent to about 75 percent of a crosslinking agent, on a solids basis. A preferred coating composition consists essentially of from about 75 percent to about 99 percent of the carboxylated amide polymer and from about 1 percent to about 25 percent of the crosslinking agent, on a solids basis. Many different crosslinking agents are suitable herein. Examples include aminoplast resins, phenolic resins, and blocked or semi-blocked polyisocyanates. Each of these classes of crosslinking agents is discussed in the following paragraphs.

Aminoplast resins are the condensation products of an aldehyde, e.g., formaldehyde, acetaldehyde, crotonaldehyde, and benzaldehyde with an amino- or amido-group carrying substance, e.g., urea, melamine, and benzoguanamine. Products obtained from the reaction of alcohols and formaldehyde with melamine, urea or benzoguanamine are preferred herein because of their good water dispersibility. Useful alcohols used to make the etherified products are monohydric alcohols such as methanol, ethanol, propanol, butanol, hexanol, benzyl alcohol, cyclohexanol, 3-chloropropanol and butoxyethanol. An etherified melamine-formaldehyde resin is the preferred aminoplast resin. U.S. Pat. No. 4,075,141, Porter et al, Feb. 21, 1978 contains a description of useful aminoplast resins and is incorporated herein by reference.

Phenolic resins include the condensation product of an aldehyde with a phenol. Formaldehyde and acetaldehyde are preferred aldehydes. Various phenols can be used, e.g., phenol per se, cresol, p-phenylphenol, p-tert-butylphenol, p-tertamylphenol and cyclopentylphenol. The methylol phenol ethers described in U.S. Pat. No. 2,597,330 (herein incorporated by reference) are especially useful.

A number of blocked or semi-blocked polyisocyanates are satisfactory crosslinking agents. Blocked isocyanates of urethane prepolymers of trimethylolpropane with the —NCO group being "blocked" or reacted with a compound, e.g., phenol to form urethane linkages are commercially available compounds and are useful herein. "The Chemistry of Organic Film Formers", Robert E. Kreiger Pub. Co., copyrighted 1977, by D. H. Solomon, pp. 216–217, contains a description of many blocked isocyanates that can be used here. The disclosure of this publication is herein incorporated by reference.

A solvent can comprise the balance of the coating composition. Water, an organic solvent or a mixture of water and an organic solvent are included in the composition for thinning and ease of application purposes. Examples of suitable organic solvents include methyl butyl ketone, dioxane, the mono- and dialkyl ethers of ethylene and propylene glycol, e.g., ethylene glycol monoethyl ether, ethylene glycol monopropyl ether, ethylene glycol monobutyl ether, and ethylene glycol dibutyl ether, xylene and toluene.

In those cases where the solvent contains a significant amount of water, it is necessary to react the carboxylated amide polymer with an organic or inorganic basic compound so as to induce water reducibility in the polymer. The reaction of a basic compound with carboxyl groups in this manner so as to impart water reducibility is well known. Examples of suitable organic and inorganic basic compounds include ammonia, mono-, di- and trialkylamines, e.g., ethylamine, propylamine, dimethylamine, dibutylamine and cyclohexylamine, mono-, di- and trialkanolamines, e.g., ethanolamine, diethanolamine, triethanolamine and propanolamine and inorganic hydroxides, e.g., potassium and sodium hydroxide.

The aqueous compositions have been found to be particularly storage stable. It is believed this characteristic is due to the fact the polymer contains no ester linkages which are susceptible to hydrolysis.

The compositions herein ordinarily will contain other optional components including pigments, various fillers, antioxidants, flow control agents, surfactants, etc. The compositions are applied by any convenient method, including spraying, dipping, flow coating and electrodeposition. While the coating compositions are especially useful for coating the interior of food and beverage containers, they can also be used for imparting a durable coating over a variety of substrates, including wood, glass, cloth and plastics.

The following examples are illustrative of the described invention, with Example V representing a preferred embodiment.

EXAMPLE I

A five liter flask is equipped with stirring means, condenser, dropping funnel, thermometer and a nitrogen inlet. Six hundred twenty-one (621) grams of a diglycidyl ether of bisphenol A (available from the Shell Chemical Company as Epon 829) and 279 grams of bisphenol A are charged to the reaction flask. The mixture is heated to 180° C., allowed to exotherm to 207° C. and then held for one hour at about 175° C. The polymerized epoxy resin has an epoxy equivalent weight of about 1220.

Following the one hour hold, 600 grams of ethylene glycol monobutyl ether is added and the mixture cooled to 90° C. At this point, 100 grams of a 28 percent aqueous ammonia solution is added and the mixture held for four hours at 80°-85° C. At the end of the four hour hold period, 100 grams of ethylene glycol monoethyl ether is added. The resultant mixture is heated to reflux with about 117 grams of distillate removed. (The distillate contains water and unreacted ammonia.) An analysis shows the mixture has a solids content of 57.5 percent and an amine equivalent weight of 3236.

Next, 109 grams of phthalic anhydride is added and the mixture held at 70°-75° C. for 90 minutes. An analysis shows the mixture has a solids content of 60.4 percent and an acid value of 29.

The product is then neutralized with a total of 67 grams of dimethylethanolamine and reduced with an additional 100 grams of ethylene glycol monobutyl ether and 3150 grams of deionized water. The final product has a solids content of 20.0 percent and an acid value of 9.6.

EXAMPLE II

Following the procedure of Example I, 603 grams of a diglycidyl ether of bisphenol A (available from the Shell Chemical Company as Epon 829) and 297 grams of bisphenol A are charged to the reaction vessel. The mixture is heated to 180° C. and allowed to exotherm. Thereafter the mixture is held at 170°-180° C. for one hour. The resultant epoxy resin has an epoxy equivalent weight of about 1850.

Six hundred (600) grams of ethylene glycol monobutyl ether is added and the reaction mixture cooled to about 90° C. At this point, 75 grams of a 28 percent aqueous ammonium solution is added and the mixture held at 90° C. for about four hours. The heat is removed and 100 grams of ethylene glycol monoethyl ether is added. The reaction mixture is heated to reflux so as to strip off about 170 grams of distillate, including water and unreacted ammonia. The mixture is next cooled to 60° C. and has added to it 43 grams of succinic anhydride. The mixture is held at 60° C. for about 15 minutes. Next, 31 grams of dimethylethanolamine are added. The heat is removed and the mixture reduced with 2157 grams of deionized water.

The reaction mixture contains 24.7 percent solids and has an acid value of 6.8.

EXAMPLE III

Example I is substantially repeated up to the point where the aqueous ammonia is added. In this example, 120 grams of a 28 percent solution of aqueous ammonia is added at 90° C. and held at this temperature for about 2 hours. Thereafter the reaction mixture is heated to reflux so as to strip off about 120 grams of distillate. The mixture is then cooled to 60° C., whereupon 79.1 grams of succinic anhydride is added and reacted.

Fifty (50) grams of dimethylethanolamine are now added to the reaction mixture so as to neutralize the carboxylated amide polymer. Then the mixture is reduced with 2100 grams of deionized water. The resultant mixture contains 25.5 percent solids and has an acid value of 13.9.

EXAMPLE IV

A polymerized epoxy resin as made in Example I is heated to 85° C. and has added to it 45 grams of ethylene diamine. The mixture is heated to 100° C. and held at this temperature for about 2 hours. The resultant mixture contains 60.6 percent solids.

The above reaction mixture is cooled to 65° C. and has 150 grams of succinic anhydride added to it. This mixture is held for 1½ hours at 82° C. Thereafter 106 grams of dimethylethanolamine is added. After about 15 minutes, 1720 grams of deionized water are added. The resultant reaction mixture comprises 27.3 percent solids and has an acid value of 19.8.

EXAMPLE V

A twelve liter flask equipped as in Example I is charged with 2,172 grams of a diglycidyl ether of bisphenol A (available from the Shell Chemical Co. as Epon 829) and 1,068 grams of bisphenol A. The mixture is heated to 180° C. and then allowed to exotherm to 223° C. The mixture is then cooled to 180° C. and held for one hour. A solvent blend of 240 grams of ethylene glycol monoethyl ether, 540 grams of ethylene glycol monobutyl ether and 1,560 grams of a mixture of propylene glycol isobutyl ether and higher homologs (available from the Dow Chemical Co. as Dowanol PiBT) is added slowly while cooling the mixture to 76° C. At this point, 271.2 grams of a 28 percent aqueous ammonia solution is added below the surface. The resulting mixture is held at 70°–75° C. for about 3 hours. After this hold period, the mixture is heated to reflux, with 306 grams of volatiles removed. The mixture is then cooled to 100° C. and has added to it 480 grams of isopropyl alcohol. After further cooling to 65° C., 235.2 grams of succinic anhydride is added and the mixture held at 65°–75° C. for 1½ hours.

The resulting product has a solids content of 56.9 percent, an acid value of 23.7 and a reduced viscosity (1:1 with ethylene glycol monobutyl ether) of U-V on the Gardner-Holdt scale.

Next, 1,179 grams of the reaction mixture is neutralized with 72 grams of an 80 percent aqueous solution of dimethylaminomethyl propanol.

EXAMPLE VI

A coating composition is formulated using 1,241 grams of the neutralized product of Example V, 60.4 grams of a methylated melamine/formaldehyde resin (available from the Monsanto Corp. as Resimene 741), 2,353 grams deionized water and 161 grams of butanol. The coating composition has a solids content of 19 percent and a #4 Ford Cup viscosity of 33.6 seconds.

The coating composition is applied to non-prebaked black plate at an application rate of 7.9 milligrams per 4 inches$^2$ and baked at 205° C. for 10 minutes. The flexibility of the coating is found to be excellent, as measured by a 15 millimeter wedge bend value. The panel is also tested by subjecting it to a moist slurry of pepper for 25 hours at 100 percent humidity. No discoloration is observed. The same results are obtained when the coating composition is applied by roll coating.

The above examples illustrate processes for making the carboxylated amide polymer of this invention as well as the use of such polymers in coating compositions. The coating compositions are particularly characterized by their good storage stability and excellent set of properties they possess when used as internal can coatings.

What is claimed is:

1. A carboxylated amide polymer, said polymer being the reaction product of (1) a compound having the formula

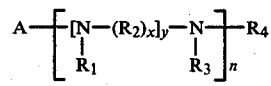

wherein A is the organic residue resulting from a ring opening reaction of a 1,2-epoxy group on a polyepoxide with ammonia or amine, $R_1$ is hydrogen or a $C_{1-4}$ alkyl group, $R_2$ is a $C_{2-12}$ alkylene group, x is 0 or 1, y is from 0 to 4, $R_3$ is hydrogen or a $C_{1-6}$ alkyl group, $R_4$ is hydrogen or a $C_{1-6}$ alkyl group, provided at least one $R_1$, $R_3$ and $R_4$ group is hydrogen and n is greater than 1.0 with (2) a cyclic anhydride of a dicarboxylic acid.

2. The carboxylated amide polymer of claim 1 wherein x is 0 and y is 1.

3. The carboxylated amide polymer of claim 1 wherein y is 0.

4. The carboxylated amide polymer of claim 1 wherein x is 1 and y is from 1 to 4.

5. The carboxylated amide polymer of claims 2 or 4 wherein $R_1$ is hydrogen.

6. The carboxylated amide polymer of claims 2, 3 or 4 wherein $R_1$, $R_3$ and $R_4$ are hydrogens.

7. The carboxylated amide polymer of claim 3 wherein $R_3$ is a $C_{1-6}$ alkyl group.

8. The carboxylated amide polymer of claim 6 wherein the cyclic anhydride has from 4 to 14 carbon atoms.

9. The carboxylated amide polymer of claim 8 wherein the cyclic anhydride is succinic anhydride.

10. The carboxylated amide polymer of claim 1 wherein A is derived from a polyglycidyl ether of a polyphenol.

11. The carboxylated amide polymer of claim 1 wherein A is derived from an addition polymerized polymer containing pendent epoxy groups.

12. The carboxylated amide polymer of claim 11 wherein A is derived from a glycidyl acrylate or methacrylate.

13. A process of making carboxylated amide polymers, comprising the steps of:

(a) reacting a polyepoxide resin with ammonia or an amine having at least two active hydrogen atoms to obtain compounds of the formula:

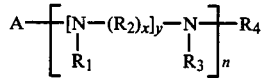

wherein A is the organic residue resulting from a ring opening reaction of a 1,2-epoxy group on the polyepoxide with the ammonia or amine, $R_1$ is hydrogen or a $C_{1-4}$ alkyl group, $R_2$ is a $C_{2-12}$ alkylene group, x is 0 or 1, y is from 0 to 4, $R_3$ is hydrogen or a $C_{1-6}$ alkyl group, $R_4$ is hydrogen or a $C_{1-6}$ alkyl group, provided at least one $R_1$, $R_3$ and $R_4$ is hydrogen and n is greater than 1.0; and (b) reacting the product of step (a) with a cyclic anhydride of a dicarboxylic acid to obtain the carboxylated amide polymer.

14. The process of claim 13 wherein a molar excess of ammonia or amine of up to about 10:1 is used in the reaction with the polyepoxide resin.

15. The process of claim 14 wherein ammonia is reacted with the polyepoxide resin.

16. The process of claim 14 wherein a primary amine is reacted with the polyepoxide resin.

17. The process of claim 14 wherein a di- or polyamine is reacted with the polyepoxide resin.

18. The process or claims 15, 16 or 17 wherein A is derived from a polyglycidyl ether of a polyphenol.

19. The process of claims 15, 16 or 17 wherein A is derived from an addition polymerized polymer having pendent epoxy groups.

20. The process of claims 15, 16 or 17 wherein the cyclic anhydride has from 4 to 14 carbon atoms.

21. The process of claim 20 wherein the product of step (a) is reacted with succinic anhydride.

22. The process of claims 15, 16 or 17 additionally comprising the step of reacting the product of step (b) with an organic or inorganic basic compound to partially neutralize or neutralize the polymer to impart water-reducibility to the polymers.

23. A coating composition consisting essentially of, on a solids basis;
(a) from about 25 percent to about 99 percent of a carboxylated amide polymer, said polymer being the reaction product of (1) compounds having the formula

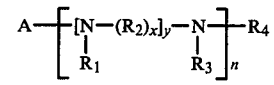

wherein A is the organic residue resulting from a ring opening reaction of a 1,2-epoxy group on a polyepoxide with ammonia or amine, $R_1$ is hydrogen or a $C_{1-4}$ alkyl group, $R_2$ is a $C_{2-12}$ alkylene group, x is 0 or 1, y is from 0 to 4, $R_3$ is hydrogen or a $C_{1-6}$ alkyl group, and $R_4$ is hydrogen or a $C_{1-6}$ alkyl group, provided at least one $R_1$, $R_3$ and $R_4$ is hydrogen and n is at least 1.0 with (2) a cyclic anhydride of a dicarboxylic acid; and
(b) from about 1 percent to about 75 percent of a crosslinking agent.

24. The coating composition of claim 23 wherein the resin is neutralized with an organic or inorganic base to impart water reducibility to the resin and the composition additionally consists essentially of water or a mixture of water and organic solvent.

25. The coating composition of claim 24 wherein x is 0 and y is 1.

26. The coating composition of claim 24 wherein y is 0.

27. The coating composition of claim 24 wherein x is 1 and y is from 1 to 4.

28. The coating composition of claims 25 or 27 wherein $R_1$ is hydrogen.

29. The coating composition of claims 25, 26 or 27 wherein $R_1$, $R_3$ and $R_4$ are hydrogens.

30. The coating composition of claim 26 wherein $R_3$ is a $C_{1-6}$ alkyl group.

31. The coating composition of claim 29 wherein the cyclic anhydride has from 4 to 14 carbon atoms.

32. The coating composition of claim 23 wherein A is derived from a polyglycidyl ether of a polyphenol.

33. The coating composition of claim 23 wherein A is derived from an addition polymerized polymer containing pendent epoxy groups.

34. The coating composition of claim 33 wherein the polymer is derived from a glycidyl acrylate or methacrylate.

35. The coating composition of claim 24 wherein the cross-linking agent is selected from the group consisting of an aminoplast resin, phenolic resin, blocked or semi-blocked polyisocyanate, and mixtures thereof.

36. The coating composition of claim 35 wherein the crosslinking agent is an etherified melamine-formaldehyde resin.

37. The coating composition of claim 35 wherein the carboxylated amide polymer is present at a level of from about 75 percent to about 99 percent and the crosslinking agent is present at a level of from about 1 percent to about 25 percent, on a solids basis.

* * * * *